United States Patent Office 3,052,653
Patented Sept. 4, 1962

3,052,653
METALLIC PHOSPHONATE CONTAINING POLYESTER
Joseph Iannicelli, Wilmington, Del., assignor to E. I. du Pont de Nemours and Company, Wilmington, Del., a corporation of Delaware
No Drawing. Filed Dec. 21, 1959, Ser. No. 860,728
7 Claims. (Cl. 260—75)

This invention relates to a high molecular weight synthetic copolyester and the shaped articles produced therefrom. More particularly it is concerned with a copolyester containing a minor proportion of a basic dye sensitizing unit as defined hereinafter and the shaped articles formed therefrom.

OBJECTS

It is an object of the present invention to provide a shaped article produced from a copolyester, the said article having affinity for basic type dyes.

Another object is to provide a process for the production of a copolyester from which shaped articles having affinity for basic type dyes can be prepared.

These and other objects will become apparent in the course of the following specification and claims.

The polymer of the present invention is useful in the production of shaped articles by extrusion, molding, casting or the like. These shaped articles in turn may be formed into yarns, fabrics, pellicles, ornaments, or the like.

NOMENCLATURE

Many classes of compounds containing carbon-phosphorus bonds are known, and there is considerable confusion concerning the nomenclature for such derivatives. In the present description reference is made to "phosphonic acids" and their salts, i.e. the "phosphonates." As used herein, the term "phosphonic acids" is applied both to primary phosphonic acids —P(O)(OH)$_2$ and secondary phosphonic acids =P(O)(OH), following the nomenclature used by G. M. Kosolapoff in his book "Organophosphorus Compounds," John Wiley & Sons, Inc., New York, 1950.

STATEMENT OF INVENTION

In accordance with the present invention, a high molecular weight copolyester wherein the ester linkages are an integral part of the polymer chain is provided, the said copolyester containing as a minor proportion, but at least about 0.5 mol percent based on the acidic component of the said polyester, a radical of the formula

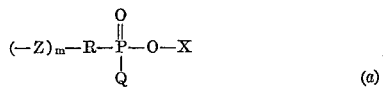
(a)

wherein —X— is the atomic equivalent of a metal; —Q is a member of the class consisting of —OH, —O—X and —R'—(Z'—)$_n$; —R— and —R'— are the same or different non-hetero, polyvalent organic radicals from the class consisting of aliphatic, alicyclic and aromatic radicals; m is an integer less than three; n is a number less than two, the sum of m and n being an integer less than three, with the proviso that when n is zero —Q is —R'—H; —Z— and —Z'— are the same or different members of the class consisting of —O— and

attached to carbon of —R— and —R'—, with the further proviso that whenever either of —Z— and —Z'— is —O—, the carbon of —R— and —R'— to which it is attached is saturated, i.e. free of double bond attachment to adjacent carbon whether conjugate or not. Preferably —R— and —R'— are hydrocarbon radicals containing no more than about ten carbon atoms and m is one. The copolyesters defined above may be produced by melt polymerizing linear polyester-forming compounds from the class consisting of a lower alkyl ester of a monohydroxymonocarboxylic acid, a lower alkyl diester of a dicarboxylic acid with a compound of the class consisting of an aliphatic glycol and a diester of an aromatic diol, and as an essential component, a minor amount of a compound of the formula

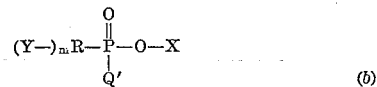
(b)

wherein —Q' is a member of the class consisting of —OH, —OX and —R'(—Y')$_n$, Y and Y' are the same or different members of the class consisting of —OH,

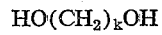

and wherein —X, —R—, —R'—, m and n are as defined above, with the proviso that when n is zero, —Q is —R'—H and with the further proviso that whenever either of —Y— and —Y'— is joined to —R— and —R'— by —O—, the carbon of —R— and —R'— to which such attachment is made is saturated.

By "the atomic equivalent of a metal" is meant the fractional part of an atom of the metallic element equal to the reciprocal of its valence in the particular compound under consideration. In calculating the molecular weight of the compound, the atomic equivalent of the metallic element is accordingly equal to its atomic weight divided by its valence.

A particularly preferred class of copolyester is prepared from a dialkyl ester of terephthalic acid and a polymethylene glycol having the formula $$HO(CH_2)_kOH$$

wherein k is an integer of from two to about ten, in the presence of at least about 0.5 mol percent, based on the terephthalate content of the polyester, of a compound of Formula b as shown above. The product comprises a modified polymeric polymethylene terephthalate containing in the polymer molecule a minor proportion of organic radicals containing a phosphonate salt group as defined in Formula a above.

The following examples are cited to illustrate the invention. They are not intended to limit it in any manner.

The intrinsic viscosity of the polymer is used herein as a measure of the degree of polymerization of the polymer and may be defined as:

$$\text{limit } \frac{\ln \eta_r}{C} \text{ as C approaches 0}$$

wherein $\eta_r$ is the viscosity of a dilute solution of the polymer in a solvent divided by the viscosity of the solvent per se measured in the same units at the same temperature; and C is the concentration in grams of the polymer per 100 ml. of solution. Fomal, which comprises 58.8 parts by weight of phenol and 41.2 parts by weight of trichlorophenol, is a convenient solvent for measuring the intrinsic viscosity of linear polyesters, and intrinsic viscosity values reported herein are with reference to Fomal as a solvent. A polyester of "high molecular weight," as used herein, indicates polymers having an I.V. value above about 0.2 (film-forming). Above about 0.3 the products are spinnable.

Example 1

A stirred solution of bis-(hydroxymethyl)phosphonic acid is neutralized with the equivalent amount of an aqueous solution of potassium hydroxide, following which the solution is evaporated under reduced pressure and dried in a vacuum oven at 80° C. The product, a glass-like solid, is potassium bis-(hydroxymethyl)phosphonate, $$(HOCH_2)_2P(O)OK$$

The following ingredients are introduced into a stainless steel batch still equipped with a stirrer and a condenser:

| | Parts |
|---|---|
| Dimethyl terephthalate | 4536 |
| Ethylene glycol | 3058 |
| Manganous acetate | 2.04 |
| Antimony trioxide | 1.36 |
| Titanium dioxide | 68 |

The mixture is heated, with evolution of methanol beginning at about 160° C., and heating is continued until the evolution of methanol ceases after about 2.5 hours, the final temperature being 225° C. 76.5 parts of potassium bis-(hydroxymethyl)phosphonate (2 mol percent based on the dimethyl terephthalate) and 2.10 parts of sodium dihydrogen phosphate are then added to the mixture. The pressure in the autoclave is thereafter reduced to 1 mm. of mercury and the temperature is increased to 275° C., such conditions being maintained for 3 hours. The polymer obtained, having an intrinsic viscosity of 0.55, is spun at 290° C. through a 34-hole spinneret (orifice diameter of 0.009 inch), the yarn being collected at 975 y.p.m. and drawn about 3.4 times its extruded length to produce a 70-denier yarn. A swatch of knit tubing prepared from this yarn is immersed for 1 hour at 125° C. in an aqueous solution adjusted to a pH of 7 of 3% (based on fabric weight) of Fuchsine SBP dye (Color Index No. 676), a basic dye of the triphenyl-methane type. The fabric is dyed a medium shade of purple having good wash-fastness properties.

A control sample of polyethylene terephthalate yarn is prepared following the above procedure, except that no potassium bis-(hydroxymethyl)phosphonate is added with the sodium dihydrogen phosphate following ester interchange. The resulting polymer has an intrinsic viscosity of 0.59. A swatch of knit tubing prepared from this yarn, when dyed with Fuchsine SBP dye under the conditions used above, adsorbs virtually none of the dye, and what little color appears is removed easily by washing.

*Example 2*

A solution of 4-carbomethoxybenzenephosphonic acid in ethanol is titrated with 0.6 N sodium hydroxide to a phenolphthalein end point. The solid product obtained by evaporation of the solution is disodium 4-carbomethoxybenzenephosphonate, $4-CH_3OOCC_6H_4P(O)(ONa)_2$.

95 parts of dimethyl terephthalate are mixed with 66 parts of ethylene glycol, 2.6 parts of disodium 4-carbomethoxybenzenephosphonate, 0.0425 part of manganous acetate, and 0.0284 part of antimony trioxide. The ratio of the phosphonate salt to dimethyl terephthalate is accordingly about 2 mol percent. Methanol is removed from the reaction mixture at 120–220° C. during 1.5 hours, following which the mixture is polymerized at 280° C. and 1 mm. of mercury for 2 hours, resulting in a polymer having an intrinsic viscosity of 0.48. A thin film pressed from the polymer is observed to be flexible. It is immersed for 2 hours at 100° C. in an aqueous solution of 2% (based on the weight of the film) of Brilliant Green dye (Color Index No. 662), a basic dye of the triphenylmethane type. The dyeing solution has a pH of 4.5. The film is dyed a medium shade of green having good wash-fastness properties.

A control sample of polyethylene terephthalate film prepared by following the above procedure, except that 97 parts of dimethyl terephthalate are used and no disodium 4-carbomethoxybenzenephosphonate is added, is found to have an intrinsic viscosity of 0.53. When dyed with Brilliant Green dye under the conditions used above, the control film adsorbs only a faint tint of the dye, which is easily removed by scouring in hot water or hot chlorobenzene.

When the preparation of the modified polyester according to the procedure described above is repeated, except that only 80.8 parts of dimethyl terephthalate is used and 14.2 parts of dimethyl isophthalate is added, a copolyester having high sensitivity to Brilliant Green dye and other basic dyes is produced. A copolyester of similar high sensitivity to basic dyes is produced by substituting for the 95 parts of dimethyl terephthalate a mixture of 71.3 parts of dimethyl terephthalate and 28.3 parts of dimethyl sebacate. Similarly, a polyester having high sensitivity to basic dyes is produced by employing a mixture of 91.3 parts of butanediol-1,4, 95 parts of dimethyl terephthalate, and 2.6 parts of disodium 4-carbomethoxybenzenephosphonate with the same catalyst and following the procedure described above.

In a similar experiment, 95 parts of dimethyl terephthalate are mixed with 2.6 parts of disodium 4-carbomethoxybenzenephosphonate, 149 parts of p-hexahydroxylylene glycol (65% trans-, 35% cis-), and 0.08 part of tetraisopropyl titanate. The copolyester produced by removing methanol for three hours as the temperature is increased to 230° C. and then polymerizing at 280° C. and 1 mm. of mercury for three hours is dyed in film form to a medium shade of green with Brilliant Green dye, whereas a control film of polymer made without the 4-carbomethoxybenzenesulfonate adsorbs only a faint tint of the dye.

*Example 3*

20 parts of dimethyl 5-aminoisophthalate are mixed with 10 parts of concentrated hydrochloric acid, 33 parts of water, and 11.7 parts of sodium fluoborate at −10° C. Then, keeping the temperature at −10° C., 5.76 parts of sodium nitrite in 12 parts of water are added dropwise to the stirred mixture during a period of 45 minutes. The resulting white pasty mass is stirred for another 30 minutes, filtered, washed with cold sodium fluoborate solution, cold methanol, and cold ether. After drying overnight, the 22.5 parts of product obtained are mixed with 90 parts of dioxane. Stirring is begun, and 1.4 parts of cuprous chloride and 9.6 parts of phosphorus trichloride are added to the mixture after which rapid evolution of gas commences, subsiding in a short time. The mixture is then cooled, 18 parts of water are added, and the solvents are evaporated. The product is dissolved in 80 parts of warm water, and the solution is neutralized to pH 7 with sodium carbonate. Ethanol is added and the resulting precipitate is filtered and dried. The solids are dissolved in dilute warm hydrochloric acid, and the solution is filtered and cooled. Four parts of crystalline product, 3,5-dicarbomethoxybenzenephosphonic acid having a melting point of 210° C., are obtained. 1.37 parts of this compound are dissolved in methanol and 0.27 part of sodium methoxide is added to form the monosodium salt, sodium hydrogen 3,5-dicarbomethoxybenzenephosphonate, $3,5-(CH_3OOC)_2C_6H_3P(O)(ONa)OH$. Ether is used to complete the precipitation of this product.

1.48 parts of the sodium salt, prepared as described above, are added to 47.5 parts of dimethyl terephthalate, 33 parts of ethylene glycol, and 0.05 part of tetraisopropyl titanate, the ratio of the phosphonate salt to dimethyl terephthalate being about 2 mol percent. Methanol is removed from the reaction mixture at 180–215° C. over a period of 3.5 hours, following which the mixture is polymerized at 280° C. and 1 mm. of mercury for 2 hours. Although the resulting polymer is substantially insoluble in Fomal, films are readily pressed from it. Several films so prepared are immersed for 2 hours at 100° C. in an aqueous solution of 3% (based on the weight of the films) of a basic dye of the oxazine type having the following chemical structure:

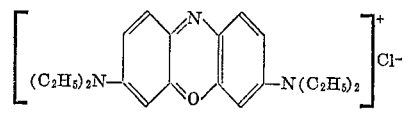

The solution has a pH of 4.5. The films are dyed to a medium dark shade of blue having good wash-fastness properties. However, a comparative control sample of polyethylene terephthalate film, in the preparation of which no sodium hydrogen, 3,5-dicarbomethoxybenzenephosphonate is used, adsorbs only a faint blue color under the dyeing conditions described above, and what color appears is easily removed by scouring in hot water or hot chlorobenzene.

*Example 4*

1.37 parts of 3,5-dicarbomethoxybenzenephosphonic acid, prepared as described in Example 3, are dissolved in methanol and 0.54 part of sodium methoxide is added to form the disodium salt, disodium 3,5-dicarbomethoxybenzenephosphonate 3,5 - $(CH_3OOC)_2C_6H_3P(O)(ONa)_2$, using ether to complete the precipitation of the product.

1.59 parts of the disodium salt prepared as described above are added to 47.5 parts of dimethyl terephthalate, 33 parts of ethylene glycol, 0.0212 part of manganous acetate, and 0.0142 part of antimony trioxide, the ratio of the phosphonate salt to dimethyl terephthalate being about 2 mol percent. Methanol is removed from the reaction mixture at 120–210° C. during 1 hour, following which the mixture is polymerized at 280° C. and 1 mm. of mercury for 2 hours. While the resulting polymer is substantially insoluble in Fomal, films are readily pressed from the polymer, which when treated with the basic dye having the structure shown in Example 3, and using the conditions described therein, are dyed to a medium dark shade of blue having good wash-fastness properties. Control films of unmodified polyethylene terephthalate have very little affinity for this dye.

While the polymeric products of Examples 3 and 4 appear to be moderately cross linked, as evidenced by their substantial insolubility in Fomal, nevertheless, they are formable into shaped structures, and films are readily cast from them. While not wishing to be bound by any theory of reaction mechanism, it is postulated that the cross linking occurs by formation of a trifunctional derivative in the reaction mass due to partial decomposition of the phosphonate addition when $m$ of Formulas $a$ and $b$ equals 2. That the major proportion of phosphorus-carbon bonds have remained intact is evidenced by the basic dyeability of the products of Examples 3 and 4.

*Example 5*

25 parts of dimethyl 2,6-naphthalenedicarboxylate are mixed with 13.6 parts of ethylene glycol, 0.33 part of potassium bis-(hydroxymethyl)phosphonate, and 0.03 part of tetraisopropyl titanate. The ratio of the phosphonate salt to dimethyl 2,6-naphthalenedicarboxylate is accordingly about 2 mol percent. Methanol is removed from the reaction mixture at 175–225° C. during 2.25 hours, following which the mixture is polymerized at 275° C. and 0.4 mm. of mercury for 4 hours and finally at 295° C. for 30 minutes at the same pressure, resulting in a film-forming polymer. A thin film pressed from the polymer, when dyed for two hours at 100° C. in an aqueous solution of 3% (based on the weight of the film) of the basic dye having the structure shown in Example 3, is dyed to a light shade of blue which is not removed by scouring in hot chlorobenzene.

A control sample of polyethylene 2,6-naphthalenedicarboxylate is prepared following the above instructions, except that no potassium bis-(hydroxymethyl)-phosphonate is added. The resulting polymer, which is of film-forming molecular weight, is pressed into a thin film. When subjected to the dye bath conditions described above, the film adsorbs a pale shade of blue; however, the blue color is easily extracted from the film by scouring in hot chlorobenzene.

*Example 6*

131.8 parts of potassium permanganate is added in small portions to a boiling solution of 50.8 parts of bis-(p-methylphenyl)phosphonic acid and 8.7 parts of sodium hydroxide in 1300 parts of water at such a rate that continuous gentle boiling is maintained. The solution is subsequently maintained at the boil for 30 minutes, after which the excess permanganate is destroyed by adding 6 parts of methanol. The manganese dioxide precipitate is filtered off, after which the filtrate is partially evaporated and acidified with concentrated hydrochloric acid. The resulting white precipitate (64 parts) is bis-(p-carboxyphenyl)phosphonic acid, M.P. 340–5° C.

9 parts of the bis-(p-carboxyphenyl)phosphonic acid is dissolved in 300 parts of 85% methanol–15% benzene and 3.6 parts of concentrated sulfuric acid is added. The solution is refluxed for 20 hours with continual slow removal of the refluxing azeotropic liquid and continual replacement of the removed liquid with equal volumes of 85% methanol–15% benzene. The resulting solution is evaporated to 25 parts and the solid which crystallizes is recrystallized from absolute methanol. 6 parts of bis-(p-carbomethoxyphenyl)phosphonic acid, M.P. 190–191° C., are obtained. 4.1 parts of the product are dissolved in a solution of 1 part of sodium in 100 parts of methanol and ether is added slowly until a white solid separates, sodium bis-(p-carbomethoxyphenyl)phosphonate.

1.67 parts of the sodium salt prepared as described above is added to 48.5 parts of dimethyl terephthalate, 33.2 parts of ethylene glycol, 0.0212 part of manganous acetate, and 0.0145 part of antimony trioxide, the ratio of the phosphonate salt to dimethyl terephthalate being about 2 mol percent. Methanol is removed from the reaction mixture at 145–220° during 4.5 hours, after which the mixture is polymerized at 280° C. and 0.25 mm. of mercury for 4 hours. While the resulting polymer is substantially insoluble in Fomal, a film is readily pressed from the polymer. The film, when dyed for two hours at 100° C. in an aqueous solution of 3% (based on the weight of the film) of the basic dye having the structure shown in Example 3, is dyed a medium shade of blue having good wash-fastness properties. As noted in Example 3, an unmodified control sample of polyethylene terephthalate film adsorbs only a faint blue color under the same dyebath conditions.

In another experiment, 0.82 part of the sodium salt prepared as described above is added to 30.5 parts of bis-2-hydroxyethyl hexahydroterephthalate, 0.01 part of manganous acetate, and 0.0065 part of antimony trioxide. The ratio of phosphonate salt to hexahydroterephthalate is accordingly about 2 mol percent. The mixture is polymerized at 275° C. and 0.2 mm. of mercury for 3 hours, resulting in a polymer having an intrinsic viscosity of 0.36. The polymer is pressed into a thin film onto a backing of satin-faced ribbon prepared from unmodified polyethylene terephthalate yarn. When the film is treated for two hours at 100° C. with an aqueous solution of 3% (based on the weight of the film) of the basic dye having the structure shown in Example 3, it is dyed a medium shade of blue.

A control sample of polyethylene hexahydroterephthalate is prepared following the above instructions, except that no sodium bis-(p-carbomethoxyphenyl)phosphonate is added, resulting in a polymer having an intrinsic viscosity of 0.6. Thin films of the polymer pressed onto a backing of polyethylene terephthalate satin-faced ribbon adsorb only a faint blue tint of color under the same dyebath conditions.

*Example 7*

A quantity of sodium bis-(m-carboxyphenyl)phosphonate is prepared, following the general procedure of Example 6 and employing bis-(m-methylphenyl)phosphonic acid as a starting material instead of bis-(p-methylphenyl)phosphonic acid. 0.78 part of the sodium bis-(m-carboxyphenyl)phosphonate is added to 33.7 parts of bis-2-hydroxyethyl terephthalate, 0.01 part of manganous acetate, and 0.007 part of antimony trioxide. The ratio of phosphonate salt to terephthalate is accordingly about 2 mol percent. The mixture is polymerized at 280° C. for 4 hours, resulting in a film-forming polymer substantially insoluble in Fomal. A film of the polymer, when dyed for two hours at 100° C. in an aqueous solution of 3% (based on the weight of the film) of the basic dye having the structure shown in Example 3, is dyed a medium shade of blue having good wash-fastness properties. As noted in Example 3, an unmodified control sample of polyethylene terephthalate film adsorbs only a faint blue color under the same dyebath conditions.

PHOSPHONATE ADDITIVE

As is illustrated in the examples, the basically dyeable copolyester of the invention may be prepared by reacting a compound of Formula $b$ with compounds useful in making a film- or fiber-forming condensation polyester. The modifying additive may be introduced at any stage of polymerization, although it is preferably added at the beginning of the polymerization reaction. As exemplified, suitable additives include both the metallic salts of primary phosphonic acids, in which case —Q' is equal to —O—H or —O—X, and the metallic salts of secondary phosphonic acids, in which case —Q' is equal to —R'(—Y')$_n$. Salts of primary phosphonates which may be employed include disodium 3,5-dicarbomethoxybenzenephosphonate,
sodium hydrogen 3,5-dicarbomethoxybenzenephosphonate, and
disodium 4-carbomethoxybenzenephosphonate, as exemplified. Other primary phosphonate salts which may be used include disodium 1-hydroxyethylphosphonate,
disodium hydroxymethylphosphonate,
calcium 1-hydroxy-1-methylbutylphosphonate,
disodium phenylhydroxymethylphosphonate,
disodium 1-phenyl-1,2-dihydroxyethanephosphonate,
dilithium 3-carboethoxypropanephosphonate,
zinc 10-carboethoxydecanephosphonate,
disodium 2-carbomethoxybenzenephosphonate,
strontium 3-carbomethoxybenzenephosphonate,
disodium 4-carbomethoxy-3-chlorobenzenephosphonate,
barium 2,4-dimethyl-5-carbomethoxybenzenephosphonate, and
disodium 4-methyl-2,5-dicarbomethoxybenzenephosphonate.

Secondary phosphonate salts which may be used include potassium bis-(hydroxymethyl)phosphonate as well as its lithium and cesium salts, sodium bis-(4-carbomethoxyphenyl)phosphonate,
sodium bis-(3-carbomethoxyphenyl)phosphonate,
cadmium bis-(1-hydroxyheptyl)phosphonate,
sodium bis-(cyclohexylhydroxymethyl)phosphonate, and
lanthanum 4-carbomethoxyphenyl-4-tolylphosphonate.

In general, compounds containing functional groups other than the ester-forming groups and phosphonate groups will be avoided. However, substituents may be present if they are relatively inert in the polycondensation reaction; thus, the modifier may contain halogen substituents or ether groups. The alkali salts are preferred. However, the phosphonate salts of alkaline earth metals and other metals may also be used. It is not necessary that the metal be univalent. In cases in which the phosphonate salt is highly insoluble, fine dispersion of the additive may be required during the early stages of the reaction. Metals such as iron or copper which normally exhibit color in their salts may, if used in the phosphonate additives, contribute a pale color to the polymer.

Preferably the modified polymers contain at least about 0.5 mol percent of modifying units, based on the number of mols of recurring ester structural units (such as the recurring ethylene terephthalate structural unit in polyethylene terephthalate). Polyesters containing less than about 0.5 mol percent of the phosphonate-carrying units will usually have only a relatively low affinity for basic dyes. Polyesters containing about 10 mol percent of phosphonate modifier have a very high affinity for basic dyes. Higher concentrations do not lead to appreciable increases in basic dyeability. Concentrations of 1 to 5 mol percent of the phosphonate modifier are regarded as optimum and are preferred. The phosphonate modified polyesters of the present invention are substantially colorless or white, an important requirement when the polymer is prepared for textile end uses.

POLYESTER-FORMING REACTANTS

Modified polyethylene terephthalate is the preferred species of the invention. Other fiber-forming, water-insoluble polyesters, which may be modified in accordance with the present invention with a modifier or modifiers as described herein as well as mixtures thereof, are polyethylene bibenzoate, prepared by condensing ethylene glycol with p,p-bibenzoic acid; poly(p-hexahydroxylyleneterephthalate), prepared by condensing terephthalic acid with cis- or trans-p-hexahydroxylylene glycol, or a mixture of the cis- and trans-isomers; polyethylene 1,5- or 2,7-naphthalenedicarboxylate, prepared by condensing ethylene glycol with dimethyl 1,5- or 2,7-naphthalenedicarboxylate; poly(p,p'-isopropylidenediphenyl isophthalate), prepared by condensing diphenylolpropane with diphenyl isophthalate; polyhexamethylene adipate, prepared by condensing hexamethylene glycol with diethyl adipate; and polyethylene sebacate, prepared by condensing ethylene glycol with dimethyl sebacate. The invention is applicable as well to polyesters produced by the self-condensation of monohydroxy carboxylates, such as ethyl-4-(beta-hydroxyethoxy)-3-methylbenzoate. The additives may also be incorporated into copolyesters, prepared by reacting a glycol with a mixture of dicarboxylic esters or a dicarboxylic ester with a mixture of glycols. Preferred polyesters are those in which the solidified polyester fibers remain tenacious when immersed in water at 100° C. Polyesters in which at least about 75% of the repeating structural units contain a carbocyclic ring constitute a preferred species for use with the phosphonate salt modifiers of the invention. Fibers which dissolve, melt, or become quite soft in boiling water obviously have relatively little utility as textile fibers which are intended to be dyed, since nearly all commercial textile dyeing operations are carried out in water at or above 100° C. The modified polyesters are highly useful as dyeable textile fibers when spun in accordance with known methods. They may also be extruded into films which are highly receptive to basic coloring materials in printing or dyeing. Ribbons and other useful shaped articles may also be prepared by known methods.

OTHER ADDITIVES

Various other materials may be present in the reaction mixture. For example, ester interchange and polymerization catalysts such as salts of calcium, manganese, or lanthanum, titanate esters such as tetraisopropyl titanate, or oxides such as antimony oxide will usually be present. Color inhibitors, such as phosphoric acid, its salts, or its alkyl or aryl esters, may be used. In addition, pigments, delusterants, or other additives may be present, such as titanium dioxide or barium carbonate.

The yarns produced from the polymer of the present invention are suitable for the usual textile applications. They may be employed in the knitting or weaving of fabrics of all types as well as in the production of non-woven, felt-like products produced by known methods. Their physical properties closely parallel those of their related polyester fibers. However, they have particular sensitivity toward basic dyes. By a "basic dye" is meant a colored cationic organic substance such as those containing sulfonium, oxonium, or quaternary ammonium functional groups. Among the basic dyes which may be applied to the filament formed in accordance with the present invention may be mentioned Victoria Green WB (C.I. 657); Rhodamine B (C.I. 749); Brilliant Green B (C.I. 662); Victoria Pure Blue BO (Pr. 198); and the like.

Many equivalent modifications of the above will be apparent to those skilled in the art from a reading of the above without a departure from the inventive concept.

This is a continuation-in-part of U.S. application 692,035, filed October 24, 1957, now abandoned.

What is claimed is:

1. A synthetic linear condensation copolymer capable of orientation along the fiber axis when in fiber form consisting essentially of a carbonyloxy polyester wherein the carbonyloxy linkages are an integral part of the polymer chain, with the proviso that in at least about 75 mol percent of the repeating ester units in the said polyester, there is at least one divalent carbocyclic hydrocarbon ring containing at least six carbons present as an integral part of the polymer chain and having a minimum of four carbon atoms between the points of attachment of the said ring in the polymer chain, the said polyester having an intrinsic viscosity of at least about 0.2 in a mixture of 58.8 parts of phenol and 41.2 parts of trichlorophenol and the said polyester containing as an integral part of the polymer chain from about 0.5 mol percentage to about 10 mol percentage, based on the acidic component of the said polyester, of a metallic salt of the structure

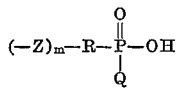

wherein Q is a member of the class consisting of —OH and —R'—(Z'—)$_n$; —R— and —R'— are hydrocarbon radicals of from 1–10 carbon atoms which may be substituted by a member of the group consisting of halogen and hydrocarbyloxy groups, $m$ is an integer less than three, $n$ is a number less than two, the sum of $m$ and $n$ being an integer less than three with the proviso that when $n$ is zero, —Q— is —R'H; Z and Z' are members of the class consisting of —O— and

attached to carbon of —R— and —R'— with the further proviso that when either of —Z— and —Z'— is —O—, the carbon of —R— and —R'— to which it is attached is saturated; the remainder of the radicals of the said polyester, to which Z and Z' are attached and which are joined by the said carbonyl-oxy linkages, being selected from the group (1) divalent hydrocarbon radicals, and (2) carbocyclic hydrocarbon radicals joined through oxaalkylene to the said carbonyl-oxy linkage.

2. The copolyester of claim 1 wherein the metal of the metallic salt is sodium.

3. The copolyester of claim 1 wherein the metal of the metallic salt is potassium.

4. The copolyester of claim 1 wherein the phosphorus containing radical is

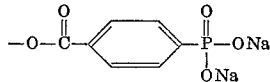

5. The copolyester of claim 1 wherein the phosphorus containing radical is

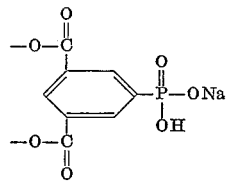

6. The copolyester of claim 1 wherein the phosphorous containing radical is

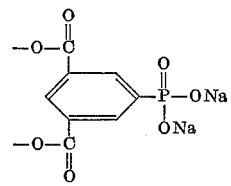

7. The copolyester of claim 1 wherein the phosphorus containing radical is

References Cited in the file of this patent

UNITED STATES PATENTS

| | | |
|---|---|---|
| 2,646,420 | Morgan | July 21, 1953 |
| 2,722,538 | Jackson | Nov. 1, 1955 |
| 2,732,367 | Shokal | Jan. 24, 1956 |